United States Patent Office 3,093,680
Patented June 11, 1963

3,093,680
ESTERS
Lee A. Miller, Dayton, Ohio, assignor to Monsanto Chemical Company, St. Louis, Mo., a corporation of Delaware
No Drawing. Filed Mar. 17, 1961, Ser. No. 96,355
5 Claims. (Cl. 260—486)

This invention relates to esters. More particularly, this invention provides esters of certain dihydric alcohol derivatives of aromatic bisphenols and certain acetylenic acid compounds, and the method of preparing the same.

An object of this invention is to provide new and valuable acetylenic acid esters. Another object of this invention is to provide diesters of a propiolic acid compound and certain glycol derivatives of bisphenol type compounds. Still another object of this invention is to provide esters having biological toxicant utility, i.e., compounds which will serve as essential effective ingredients of fungicidal and bactericidal compositions.

These and other objects hereinafter defined are provided by the invention wherein there are prepared new and valuable esters of the formula

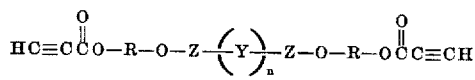

wherein R is an alkylene radical having from 2 to 4 carbon atoms in the alkylene chain and from 2 to 6 carbon atoms in the alkylene radical; Z is selected from the group consisting of a bivalent arene radical having from 6 to 8 carbon atoms, and halogen-substituted bivalent arene radicals having from 6 to 8 carbon atoms; Y is a bivalent paraffin hydrocarbon radical having from 1 to 12 carbon atoms, and n is a whole number of from 0 to 1.

Simple examples of compounds within the scope of this invention are:

1,3-propylenebis[2-(4-phenoxy)ethyl propiolate],
1,2-ethylenebis[3-(2,3,5,6-tetrachloro-4-phenoxy)propyl propiolate],
Isopropylidenebis[2 - (3 - methyl - 4 - phenoxy)ethyl propiolate],
2,2-butylidenebis[3-(3,6-dimethyl-4-phenoxy)butyl propiolate],
2,2'-(2,2'-dichlorobiphenylenedioxy)diethyl dipropiolate, and
4,4'-(3,3'-dibromo-5-5' - dimethylbiphenylenedioxy) - dibutyl dipropiolate.

The presently provided acetylenic esters are prepared by reaction of propiolic acid, or an acyl halide, or anhydride thereof with a complex dihydric alcohol of the formula

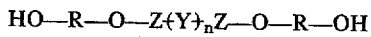

wherein R, Y, Z, and n are as defined above. These esters can also be prepared by reacting the aromatic dihydric alcohol, above, with a simple propiolate ester, e.g., with methyl propiolate to obtain the desired dipropiolate ester plus methanol as a by-product.

The presently useful dihydric alcohol compounds used to prepare the diesters of this invention may in turn, be prepared by reacting an alkylene oxide, e.g., ethylene oxide, propylene oxide, isobutylene oxide, etc. with a bivalent paraffin hydrocarbon diphenol compound, i.e., a compound of the formula

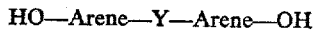

or a diphenol type compound of the type

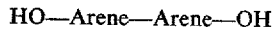

wherein Arene and Y are as defined above. Thus, for example, by reacting ethylene oxide with 4,4'-isopropylidenebis(2,2',6,6'-tetrachlorophenol) there is obtained isopropylidenebis[2 - (2,2',6,6' - tetrachlorophenoxy)ethanol], and by reacting propylene oxide with p,p'-biphenol, there is obtained an aromatic glycol, 2,2'-(p,p'-biphenyldioxy)diethanol. These aromatic dihydric alcohol compounds may also be prepared by the halohydrin process which involves reacting the bivalent paraffin hydrocarbon diphenol, or bisphenol compound with an alkali metal base, e.g., sodium, in the presence of an alcohol, e.g., ethanol and then reacting the thus obtained alkali metal salt with a substantially equimolar amount of a halohydrin compound such as ethylene chlorohydrin, propylene chlorohydrin, isobutylene chlorohydrin, ethylene bromohydrin, propylene bromohydrin, 4-chlorobutanol, 1-bromo-2-methyl butanol, etc., to obtain the desired aromatic dihydric alcohol, which can then be readily separated from the alkali metal halide by-product, if desired.

Examples of useful compounds of the type wherein Y is a chemical bond linking the two phenylene rings are:

2,2' - (2,2',6,6' - tetrabromo - 4,4' - diphenylenedioxy)-diethanol,
2,2' - (3,3' - dichloro - 4,4' - biphenylenedioxy)diisopropanol,
3,3'-(octachloro-4,4'-biphenylenedioxy)diisobutanol,
4,4'-(2,2'-dimethyl-4,4'-biphenylenedioxy)dibutanol, and
4,4' - (2,2' - dimethyl - 6,6' - dichloro - 4,4' - biphenylenedioxy)bis(2-methylbutanol).

Examples of aromatic dihydric alcohols having a bivalent paraffin hydrocarbon radical bonded between two arene rings, i.e., compounds of the above generic formula wherein Y is a bivalent paraffin hydrocarbon radical are:

Methylenebis[2-(4-phenyleneoxy)ethanol],
1,2-ethylenebis[3-(3-methyl-4-phenleneoxy)propanol],
Ethylidenebis[2-(2-bromo-4-phenyleneoxy)propanol],
1,3 - propylenebis[4 - tetrachloro - 4 - phenyleneoxy)butanol],
Isopropylidenebis[3-(3,5-dibromo - 4 - phenyleneoxy)-4-methylpentanol],
1,4-butylenebis[2-(4-phenyleneoxy)ethanol],
2,2-butylidenebis[4-(3,5-dimethyl - 4 - phenyleneoxy)-2-ethylbutanol],
1,6-hexylenebis[2-(2-bromo-4-phenyleneoxy)ethanol],
4,4-heptylidenebis[4-(3-methyl-4-phenyleneoxy)butanol],
1,3-octylenebis[2-(2,6-dichloro-4-phenyleneoxy)ethanol],
6,6,-docylidenebis[3-(4-phenyleneoxy)propanol], and
4,8-dodecylenebis[4-(3-chloro-6-methyl-4-phenyleneoxy)-butanol].

The acetylenic acid compounds which are reacted with an aromatic glycol of the above-defined types are preferably propiolic acid or the propiolyl halide or the anhydride of said acid. Thus, propiolic acid, propiolyl chloride, bromide, iodide or fluoride, or propiolic acid anhydride may be used as the acidic reactant. The propiolyl halide to be used as one of the reactants of the esterification reaction may be prepared by reacting propiolic acid with a benzoyl halide. The reaction between benzoyl halide and propiolic acid is almost instantaneous at ambient temperature and being an equilibrium reaction it is desirable to remove one of the product materials during the course of the reaction in order to shift the equilibrium in the desired direction. In this respect, propiolyl halide is relatively more volatile than other materials in the reaction mass and for that reason the temperature of reaction is controlled to cause substantial vaporization of the propiolyl halide during the course of the reaction. The preparation of propiolyl chloride according to this procedure forms the subject of copending application of Lee A Miller, Serial No. 6,344, filed February 3, 1960. The propiolyl chloride so formed may be led directly, without intermediate recovery, into a solution or suspension of the aromatic glycol which is to be esterified according to this invention.

Reaction of an aromatic glycol of the above-defined types with propiolic acid, propiolyl halide or the anhydride of said acid takes place readily by simply contacting the acidic compound with the aromatic glycol reactant at ordinary or increased temperature and in the presence of an inert diluent or solvent. Advantageously, when propiolic acid is used, reaction is effected at a temperature of from say, 25 to 200° C. with temperatures on the order of 50 to 120° C. being preferred, and the heating within this temperature range is conducted until the desired degree of esterification has occurred, that is, until the dipropiolate of the aromatic glycol used has been formed. Using the propiolyl halide, optimum conditions include operation at temperatures which may be as low as, say, −10° C., that is, extraneous heating is unnecessary; instead cooling may be employed. It is advantageous to employ the reactants in stoichiometric proportions; however, a slight excess of either the acidic reactant or aromatic glycol compound may be used. In the presence of an inert diluent or solvent and operating at a temperature which is below 120° C., the reaction proceeds to form the dipropiolate ester of the aromatic glycol compound. To obtain a product which is substantially only the dipropiolate ester, the reaction is discontinued when the quantity of evolved by-product is that calculated for dipropiolate esterification. In this case, any excess acidic reactant which is present is removed from the reaction mixture, for example, by distillation or extraction. Thus, whether or not the reactants are present in stoichiometric proportions, the use of an inert diluent or solvent and operation at a temperature below 200° C. for a time sufficient to remove the calculated amount of an evolved by-product are recommended for obtaining the presently provided well characterized esters in good yield. Use of temperatures below 200° C. and operation in the presence of a diluent permit substantial limitation of the reaction to diesterification, rather than to other reactions which could be expected to occur with the highly active triple bond acidic compounds and the bifunctional hydroxy compounds, for example, addition of the hydroxy radical across the triple bond acidic component, polymerization of the acidic compound, linear condensation of the aromatic glycol through the etherification, etc.

Inert liquid diluents which are useful for the present purpose are liquid hydrocarbons generally, halogenated hydrocarbons, ethers or ketones, for example, benzene, toluene, xylene, hexane, petroleum spirits, dichlorobenzene, ethylene dichloride, carbon tetrachloride, tetrachlorohexane, dioxane, isopropyl ether, acetone, butanone, etc. A solvent or diluent, of course, serves to facilitate uniform distribution of the reactants throughout the reaction medium. When reacting a propiolyl halide with the aromatic glycol, it is preferred to employ a solvent or diluent which minimizes the tendency of the hydrogen halide by-product to react with the triple bond of the propiolic acid compound. In this connection, the solvent or diluent is selected on the basis of being the least compatible or having the poorest solvency for hydrogen halide. The preferred solvents or diluents for this purpose may be cycloalkanes, for example, cyclohexane, cyclopentane, or the alkyl-substituted cycloalkanes, etc., and the halogenated hydrocarbons. When using propiolic acid as a starting material in the esterification reaction, water is formed as a by-product material. Since the reaction is of the equilibrium type, it is preferred that the by-product water be removed continuously during the course of the reaction in order to have equilibrium shift in the desired direction. A solvent or diluent employed in the reaction may be selected on the basis that it will form an azeotrope with water or that it boils above water, and thus the temperature of reaction can be maintained at a level which facilitates removal of the water without affecting the diluent or solvent. Considering the prerequisites of a solvent or diluent, generally any organic material which is non-reactive with either the reactants or the product materials may be employed. The quantity of solvent or diluent employed in the reaction varies considerably depending upon the result which is desired. In some instances, it may be desirable to employ a relatively small quantity of diluent as compared to the amounts of reactants which are being used, whereas in other cases, it may be desirable to use a relatively large quantity of the solvent or diluent to facilitate intermixing of the reactants.

I have also found that when effecting the reaction with the free acid or the acid anhydride as the propiolic acid reactants, it is advantageous to operate in the presence of an acidic material as catalyst. Acids which are useful for this purpose are, for example, the mineral acids, such as sulfuric or chlorosulfonic acid, acidic salts, e.g., magnesium bisulfite and organic sulfonic acids, such as benzenesulfonic acid, or 4-toluenesulfonic acid, etc.

Dipropiolate esters thus provided by this invention are, for example, the dipropiolates such as:

2,2′ - (2,2′,6,6′ - tetrabromo - 4,4′ - biphenylenedioxy)-diethyl dipropiolate,
2,2′ - (3,3′ - dichloro - 4,4′ - biphenylenedioxy)diisopropyl dipropiolate,
3,3′ - (octachloro-4,4′ - biphenylenedioxy)diisobutyl dipropiolate,
4,4′ - (2,2′ - dimethyl - 4,4′ - biphenylenedioxy)dibutyl dipropiolate, and
4,4′ - (2,2′ - dimethyl - 6,6′ - dichloro - 4,4′ - biphenylenedioxy)-bis(2-methylbutyl) dipropiolate As examples of dipropiolate esters of aromatic dihydric alcohols having a bivalent paraffin hydrocarbon radical bonded between two arene rings may be mentioned, e.g., the dipropiolate esters such as:

Methylenebis[2-(4-phenyleneoxy)ethyl propiolate],
1,2-ethylenebis[3-(3-methyl-4-phenyleneoxy)propyl propiolate],
Ethylidenebis[2-(2-bromo-4-phenyleneoxy)propyl propiolate],
1,3-propylenebis[4-tetrachloro-4-phenyleneoxy)butyl propiolate],
Isopropylidenebis[3 - (3,5 - dibromo - 4 - phenyleneoxy)-4-methylpentyl propiolate],
1,4-butylenebis[2-(4-phenyleneoxy)ethyl propiolate],
2,2 - butylidenebis[4 - (3,5 - dimethyl - 4 - phenyleneoxy)-2-ethylbutyl propiolate],
1,6 - hexylenebis[2 - (2 - bromo - 4 - phenyleneoxy)ethyl propiolate],
4,4 - heptylidenebis[4 - (3 - methyl - 4 - phenyleneoxy) butyl propiolate],
1,3 - octylenebis[2 - (2,6 - dichloro - 4 - phenyleneoxy) ethyl propiolate],
6,6 - dodecylidenebis[3 - (4 - phenyleneoxy)proply propiolate], and
4,8 - dodecylenebis[4 - (3 - chloro - 6 - methyl - 4-phenyleneoxy)butyl propiolate].

The presently provided dipropiolate esters of the aromatic glycols mentioned above are stable, well characterized compounds which are advantageously employed for a variety of industrial and agricultural purposes, for example, as hardening agents in synthetic rubber manufacturing processes; as plasticizers for natural and synthetic resins, e.g., in polyvinyl chloride polymers; as cross-linking agents for polyol materials such as polysaccharides, examples being cellulose and starch materials to enhance the chemical and physical properties thereof.

The present compounds may be advantageously employed as biological toxicants by incorporating them into liquid or solid carrier adjuvant materials, e.g., surface active agents, solvents, diluents, etc., to give compositions which may be applied to either infested areas or to locales which may be subjected to infestation. For instance, testing of the isopropylidene-bis[2-(2,6-dichloro-4-phenyleneoxy)ethyl propiolate] of Example 3, and isopropylidenebis[2 - (2,6 - dibromo - 4 - phenyleneoxy)-ethyl propiolate] of Example 4 against the apple scab fungus, *Venturia inaequalis*, and the tomato blight fungus, *Phytophthora infestans*, respectively, showed the dipropiolates to inhibit the growth of the respective fungi at a concentration of 0.01%. They may be dissolved or suspended in an organic liquid diluent or solvent which solution or mixture may then be admixed with water containing an emulsifying agent to form an oil-in-water emulsion. Because of their effectiveness, they need be present in toxicant compositions in only very small concentrations, for example, in concentrations of from 0.0001 percent to 1.0 percent by weight of the total weight of the emulsions. Emulsifying agents which may be employed are those customarily used in the art for the preparation of oil-in-water emulsions. Examples of emulsifying agents which may be used include alkylbenzene sulfonates, long-chained polyalkylene glycols, long-chained alkyl sulfosuccinates, etc. These compounds may also be incorporated into solid carriers such as clay, talc, pumice, or bentonite to give compositions which may be applied as dusts or admixed with commercial fertilizer compositions and applied by conventional apparatus used in the art. They may also be dissolved in liquefied gases such as fluorochloroethanes, or methyl chloride and applied from aerosol bombs containing the solution.

The invention is further illustrated by, but not limited to, the following examples.

*Example 1*

This example illustrates how the complex aromatic glycols used as starting materials for preparing the dipropiolates of this invention may be obtained.

To a reaction vessel containing 300 ml. of absolute ethyl alcohol there was added 4.6 g. (0.2 gram atom) of metallic sodium. After the sodium had completely reacted 46.2 g. (0.1 mole) of octachlorobiphenol was added and then just enough water was added to make the reaction mixture homogeneous. After bringing the mixture to reflux temperature, 18.8 g. (0.22 mole, 10% excess) of ethylenechlorohydrin in 100 ml. of absolute alcohol was added over a 15 minute period. The reaction mixture was stirred at reflux for 24 hours, cooled and filtered free of water insoluble solid. The solid precipitate was washed with ethyl ether and the washings were added to the filtrate which was evaporated to a red-brown oil, which was dissolved in ethyl ether. The ether solution was washed with a 100 ml. portion of 5% sodium hydroxide solution and then with water. After separating the aqueous phase, the ethereal phase was dried over anhydrous magnesium sulfate and evaporated to leave 2 g. of 2,2'-(octachlorobiphenylenedioxy)-diethanol, having the structure

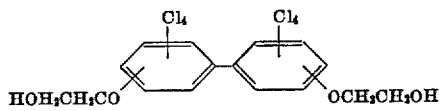

This compound is esterified to the dipropiolate ester by the method described in Example 3 below, to obtain 2,2'-(octachlorobiphenylenedioxy)diethanol dipropiolate.

*Example 2*

To a sodium ethoxide solution, prepared by adding 4.6 g. of elemental sodium to 300 ml. of absolute ethyl alcohol, there was added 18.6 g. (0.1 mole) of p,p'-biphenol. After bringing the mixture to reflux, 20.2 g. (0.22 mole, 10% excess) of 3-chloro-1-propanol in 50 ml. of absolute ethyl alcohol was added dropwise over a 15 minute period. The resulting mixture was stirred at reflux for 24 hours, cooled to room temperature, and filtered. The filtrate was evaporated to a mushy solid which was stirred with 150 ml. of 5% sodium hydroxide solution and filtered to give 8.5 g. of crude 3,3'-(4,4'-biphenylenedioxy)dipropanol, which was water washed and recrystallized from ethanol to obtain the pure compound, M.P. 185–188° C.

This compound can be esterified according to the procedure described in Example 3 to obtain 3,3'-(4,4'-biphenylenedioxy)dipropyl dipropiolate.

*Example 3*

A mixture of 15.9 g. (0.035 mole) of isopropylidene-bis[2-(2,6-dichloro-4-phenyleneoxy)ethanol], 7.0 g. (0.1 mole) of propiolic acid, 0.5 g. of p-toluenesulfonic acid, and 150 ml. of benzene was stirred at reflux under a Dean-Stark apparatus for 4 hours during which time 1.3 ml. of water (100% of theoretical) had evolved. The mixture was cooled to room temperature, diluted with 100 ml. of ether and washed successively with two 100 ml. portions of 10% sodium bicarbonate solution and two 100 ml. portions of water. The solvent was removed to obtain 13.4 g. of a colorless crystalline isopropylidene-bis[2-(2,6-dichloro - 4 - phenyleneoxy)ethyl propiolate], which after recrystallization from ethanol melted at 139–140° C. and analyzed 53.49% carbon and 3.88% hydrogen as compared to 53.79% carbon and 3.61% hydrogen, the calculated values. Infrared analysis gave the following results.

| Cm.$^{-1}$ | Function indicated |
|---|---|
| 3,300 | ≡CH. |
| 2,125 | C≡CH. |
| 1,725 | C=O. |
| 1,600, 1,550, 1,480 | —C=C (aromatic). |
| 1,280, 1,230 | —C—O—ester. |
| 900, 665 | Aromatic substituents. | which data are consistent with the structure

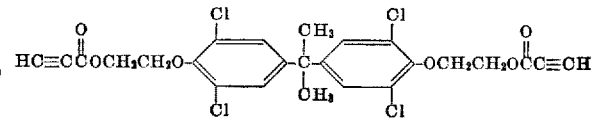

*Example 4*

A mixture of 31.6 g. (0.05 mole) of isopropylenebis [2-(2,6-dibromo-4-phenyleneoxy)ethanol] 7.7 g. (0.11 mole, 10% excess) of propiolic acid, 150 ml. of benzene, and 0.5 g. of p-toluenesulfonic acid was refluxed for 15 hours at which time 1.7 ml. of water by-product (95% of theory) had evolved. Refluxing was discontinued and the reaction mixture was diluted with ethyl ether and washed as in Example 3, dried over anhydrous magnesium sulfate, and evaporated to give 35.4 g. of crude amorphous product. The product was recrystallized from ethanol to obtain the pure isopropylenebis[2-(2,6-dibromo-4-phenyleneoxy)ethyl propiolate], M.P. 147–149° C., which analyzed 40.90% carbon and 2.96% hydrogen as compared to 40.79% carbon and 2.73% hydrogen, the calculated values. Infrared analysis data were as follows:

| Cm.$^{-1}$ | Function indicated |
|---|---|
| 3,300 | ≡CH. |
| 2,120 | —C≡CH. |
| 1,720 | —C=O. |
| 1,595, 1,550 | —C=C (aromatic). |
| 1,240, 1,230 | —C—O—ester or ether. |
| 900, 700 | aromatic substituents. | which data are in agreement with the proposed structure

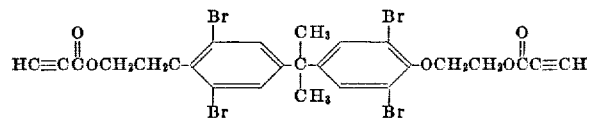

I claim:
1. A compound of the formula

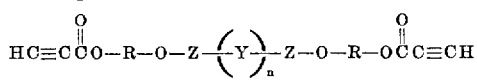

wherein R is an alkylene radical having from 2 to 4 carbon atoms in the alkylene chain and from 2 to 6 carbon atoms in the alkylene radical; Z is selected from the group consisting of a bivalent arene radical having from 6 to 8 carbon atoms, and halogen substituted bivalent arene radicals having from 6 to 8 carbon atoms; Y is a bivalent paraffin hydrocarbon radical having from 1 to 12 carbon atoms, and $n$ is a whole number of from 0 to 1.

2. A compound of the formula

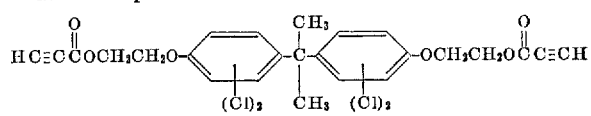

3. A compound of the formula

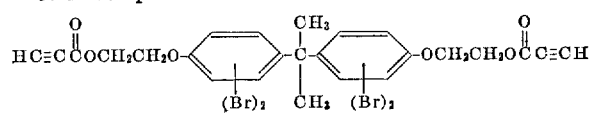

4. A compound of the formula

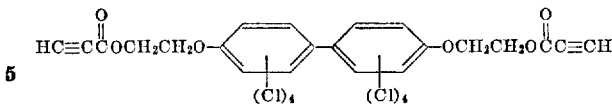

5. A compound of the formula

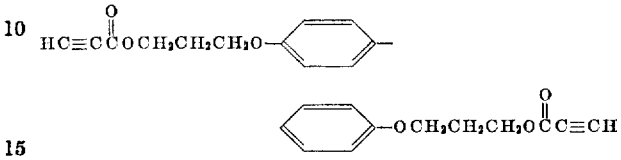

References Cited in the file of this patent
UNITED STATES PATENTS

| | | |
|---|---|---|
| 2,503,726 | Greenlee | Apr. 11, 1950 |
| 2,859,250 | Woodbridge et al. | Nov. 4, 1958 |

OTHER REFERENCES

Heaton et al.: J.A.C.S., vol. 71, pages 2948–2949 (1949).

UNITED STATES PATENT OFFICE
CERTIFICATE OF CORRECTION

Patent No. 3,093,680  June 11, 1963

Lee A. Miller

It is hereby certified that error appears in the above numbered patent requiring correction and that the said Letters Patent should read as corrected below.

Column 1, line 43, for "3", first occurrence, read -- 4 --; column 2, line 36, for "phenleneoxy" read -- phenyleneoxy --; line 38, before "tetrachloro" insert an opening parenthesis; line 48, for "docylidenebis" read -- dodecylidenebis --.

Signed and sealed this 11th day of February 1964.

(SEAL)
Attest:
ERNEST W. SWIDER

EDWIN L. REYNOLDS

Attesting Officer

Acting Commissioner of Patents